United States Patent [19]
Hui

[11] Patent Number: 5,145,639
[45] Date of Patent: Sep. 8, 1992

[54] DUAL-PHASE REACTOR PLANT WITH PARTITIONED ISOLATION CONDENSER

[75] Inventor: Marvin M. Hui, Cupertino, Calif.

[73] Assignee: General Electric Company, San Jose, Calif.

[21] Appl. No.: 733,902

[22] Filed: Jul. 22, 1991

[51] Int. Cl.[5] .............................................. G21C 15/18
[52] U.S. Cl. ................................... 376/283; 376/299; 165/111
[58] Field of Search ...................... 376/283, 298, 299; 165/111

[56] References Cited

U.S. PATENT DOCUMENTS 4,664,877 5/1987 Magee et al. ........................ 376/283
5,082,619 1/1992 Sawyer ................................ 376/283

Primary Examiner—Daniel D. Wasil
Attorney, Agent, or Firm—Robert R. Schroeder

[57] ABSTRACT

A nuclear energy plant housing a boiling-water reactor utilizes an isolation condenser in which a single chamber is partitioned into a distributor plenum and a collector plenum. Steam accumulates in the distributor plenum and is conveyed to the collector plenum through an annular manifold that includes tubes extending through a condenser pool. The tubes provide for a transfer of heat from the steam, forming a condensate. The chamber has a disk-shaped base, a cylindrical sidewall, and a semispherical top. This geometry results in a compact design that exhibits significant performance and cost advantages over prior designs.

3 Claims, 2 Drawing Sheets

DUAL-PHASE REACTOR PLANT WITH PARTITIONED ISOLATION CONDENSER

The Government has rights in this invention under Contract No. DE-AC03-90SF18494.

BACKGROUND OF THE INVENTION

The present invention relates to nuclear reactor plants and, more particularly, to isolation condensers for such plants. A major objective of the present invention is to provide an a simpler and more compact isolation condenser characterized by improved flow stability.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

Dual-phase reactors store heat generated by the core primarily in the form a phase conversion of a heat transfer medium from a liquid phase to a vapor phase. The vapor phase can used to physically transfer stored heat to a turbine and generator, which are driven to produce electricity. Condensate from the turbine can be returned to the reactor, merging with recirculating liquid for further heat transfer and cooling. Dual-phase reactors are contrasted with single-phase reactors, which store energy primarily in the form of elevated temperatures of a liquid heat-transfer medium. Pressurized water reactors (PWRs) are considered single-phase in that the reactor coolant is maintained in a liquid state, although heat from the pressurized water is used to boil a secondary coolant to drive a turbine. The primary example of a dual-phase reactor is a boiling-water reactor (BWR). The following discussion relating to BWRs is readily generalizable to other dual-phase reactors.

Modern BWRs provide for the removal of reactor decay heat from a reactor pressure vessel in the event the turbine becomes isolated from the reactor. During a turbine shutdown, a valve on the main steam line is closed preventing steam from reaching the turbine. Even after the reactor is shut down by fully inserting the control rods, decay heat continues to be generated for a period of days. This heat generates steam, which if left to accumulate in the reactor pressure vessel, could exceed the vessel's pressure-bearing specifications, potentially inducing a breach. An isolation condenser is one type of system designed to handle steam during turbine isolation to avoid excessive pressure accumulation.

A typical isolation condenser includes an upper distributor chamber and a lower collector chamber. The chambers are immersed in the water of a condenser pool. The chambers are coupled via an array of vertical tubes which extend therebetween and through intermediate pool water. During isolation, steam is conveyed to the distributor chamber. The steam is forced through the tubes, which through heat exchange with the condenser pool, condense the steam so that water flows into the collector chamber. A drain conduit coupled to the outlet chamber conveys the condensate to the reactor to replenish its coolant supply.

The performance of such a condenser can be impaired when the condenser pool has been heated to saturation. At that point, steam generated in the pool can insulate the heat-exchanger tubes, limiting further heat transfer and causing thermal cycling in the manifold. The thermal cycling can stress the condenser, impairing its structural integrity and inducing pool-side flow instability.

Other problems with such a conventional isolation condenser concern the amount of material required to ensure the distributor and collector can withstand the large pressure differentials that can develop between their interiors and the condenser pool. Pressure differentials of up to about 1250 pounds per square inch must be accommodated. The relatively flat boundaries, including the tube sheets, of the disk-shaped distributor and collector require considerable thickness to withstand this pressure. The thickness not only adds bulk and mass to the condenser, but subjects it to thermal stresses due to the larger thermal gradients that thicker material can sustain.

What is needed is a more compact, lightweight isolation condenser that is less subject to flow instability. In addition, the condenser should be economical to manufacture and maintain.

SUMMARY OF THE INVENTION

In accordance with the present invention, a dual-phase reactor plant incorporates an isolation condenser that isolates a contiguous volume that is divided by a partition into a distributor plenum and a collector plenum. These plenums are coupled by tubes of a manifold that pass through a condenser pool in which the condenser is disposed. The condenser has a base, a vertically extending sidewall, and a domeshaped top. The cross section of the sidewall is such that the area it encloses measures at least the square of one-fourth its perimeter.

The plant includes a containment structure, typically of concrete, that defines a dry well, a wet well, and a condenser well. The reactor is in the dry well, which is otherwise filled with noncondensible gases. The condenser is in the condenser well, immersed in coolant. The wet well holds a suppression pool of coolant. The reactor produces vapor which drives a turbine, which in turn can be used to drive a generator to produce electricity. During normal operation, conduits convey vapor from the reactor to the turbine and condensate from the turbine to the reactor.

When the turbine is decoupled from the reactor, a resulting pressure buildup triggers a relief valve that permits vapor to escape to the distributor plenum of the condenser. The vapor is distributed to the manifold tubes where they give up heat energy to the suppression pool. The loss of energy results in condensation of the vapor to liquid. The liquid flows through the sidewall into the outlet chamber. From the collector plenum, the liquid flows into the reactor through a conduit that mates with the reactor below its nominal liquid level. Noncondensible gases accumulating in the collector plenum can be conveyed by a conduit to the suppression pool.

The present design provides for enhanced flow stability relative to the conventional condenser. In the latter case, steam forming on the outside of a heat-exchanger tube tends, under the influence of gravity, to flow upward. Since the tubes are vertical, the rising steam forms an insulating sheath about the tube, impairing its heat-transfer capability. Movement of steam reaching the top of a tube is then impeded by the tube plate of the distributor chamber. Thus, steam remains in the manifold vicinity, impeding the performance of the condenser and threatening its integrity. In the present design, the heat-exchange tubes extend radially from the condenser chamber. Rising steam escapes the tube at which it was generated, perhaps passes between the tubes of another array, and then rises unimpeded to the surface of the condenser pool. This relatively free movement of steam induces convection, minimizes hot spots within the pool, and further ushers steam away from the tubes. Thus, optimal heat exchange is maintained and the structural integrity of the condenser is prolonged.

The radial arrangement of heat-exchanger tubes has the further advantage that longer tubes do not require a taller condenser. Because vertical constraints do not have to be divided three ways between two chambers and the tubes, the single condenser chamber can be made relatively tall, as can each of its plenums. The relatively tall collector plenum permits a relative high entrance level for a noncondensible gas outlet, providing improved separation of noncondensible gases from condensate.

The novel condenser geometry provides favorable distribution of stresses induced by pressure differentials between the suppression pool and the internal volume of the condenser. The improved stress handling allows thinner boundary walls to be used with less reinforcement. This in turn reduces thermal gradients through the walls and hot spots within the walls. Reducing thermal gradients and hot spots reduces thermal stresses and prolongs the useful lifetime of the condenser.

The compactness provides proportionate advantages in the size of the containment structure, which strongly impacts plant cost. In addition, the vertical design combined with compactness, along with the employment of a relatively small and light cover, minimize the requirements for overhead access. This makes maintenance more convenient and more economical. These and other features and advantages of the present invention are apparent from the description below with reference to the following drawings.

DESCRIPTION OF THE PREFERRED EMBODIMENTS

Figure 1:
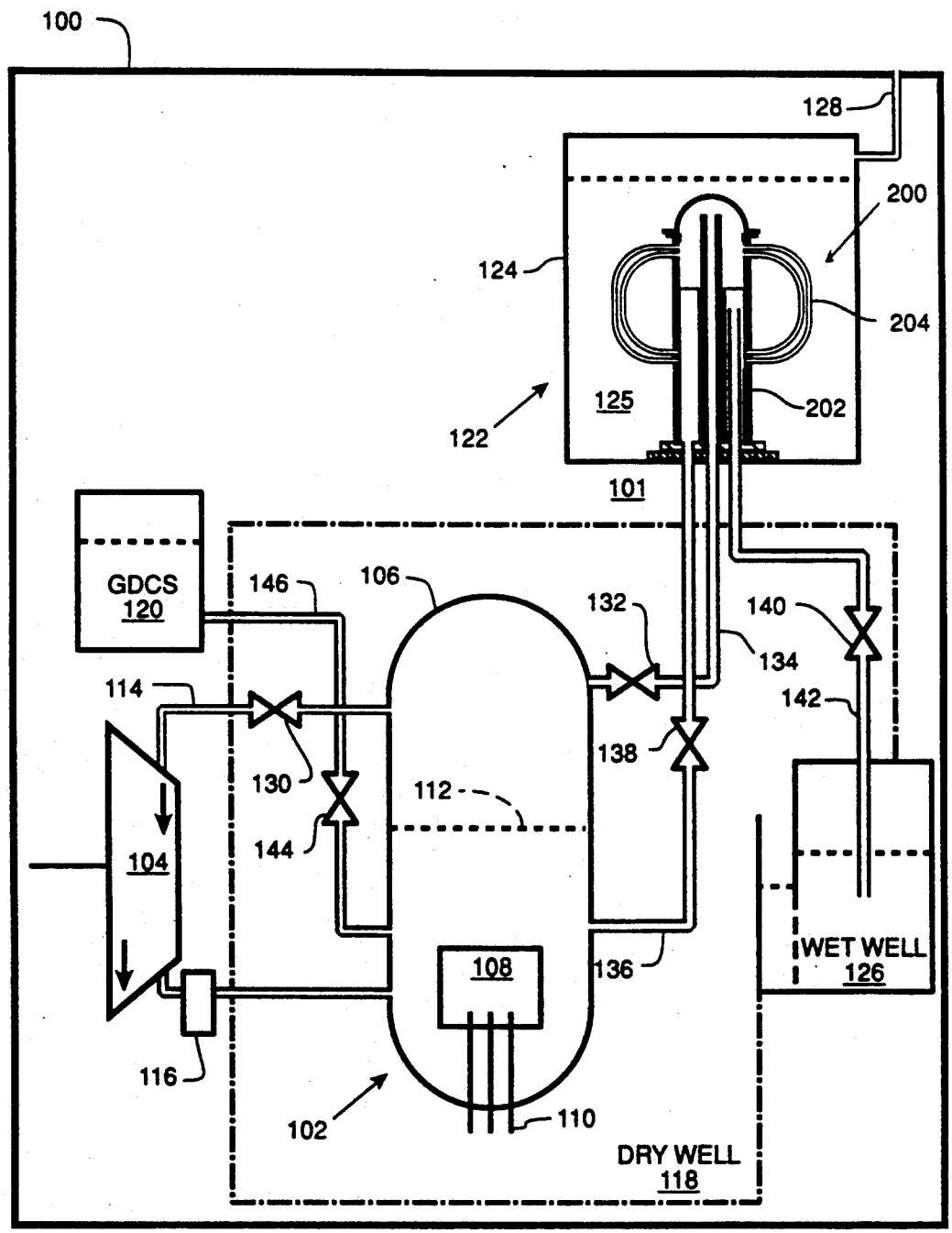
FIG. 1 is a schematic elevation view of a nuclear reactor plant in accordance with the present invention.

A nuclear reactor plant 100 comprises a concrete containment 101, a nuclear reactor 102 and a turbine 104 to be driven by reactor 102, as shown in FIG. 1. Turbine 104 is used to drive a generator to generate electricity. Reactor 102 includes a reactor vessel 106 and its internals, including a fissionable core 108. The activity of core 108 is regulated by inserting and withdrawing control rods 110. Reactor 102 contains water, up to a nominal level 112, and steam. The water circulates up through core 108 to transfer heat therefrom. Steam resulting from this heating exits vessel 106 via a turbine steam conduit 114. This steam condenses as it drives turbine 104, and the resulting condensate returns to vessel 106 via a feedwater conduit system 116. A dry well 118 houses reactor 102 and is otherwise filled with nitrogen. A gravity driven coolant system (GDCS) 120 is used to at least temporarily replenish coolant lost from vessel 106 during emergency operations.

Upon turbine isolation, an isolation condenser system 122 is used to dissipate pressure, decay heat, and sensible heat from reactor 102. Condenser system 122 has a condenser well 124 and an condenser 200 submerged in a condenser pool 125 of water. Condenser pool 125 is vented via a vent conduit 128.

During normal operation, a turbine valve 130 and a condenser valve 132 are open. During isolation condenser (IC) mode, condenser valve 132 stays open while turbine valve 130 is closed, diverting steam that would have driven turbine 104 through condenser conduit 134 to condenser 200. Condensate from condenser 200 flows back to vessel 106 via isolation return conduit 136 and valve 138, which is open during IC mode. Note that while conduits 134 and 136 are shown coupling independently with vessel 106, in practice they share connections with turbine conduits 114 and 116, respectively, to minimize the number of penetrations of the vessel wall.

Normally, a vapor valve 140 remains closed during IC mode. However, vapor valve 140 can be opened to permit vapor, especially noncondensibles, to transfer from collector plenum 218 via conduit 142 to wet well 126. Valve 140 is typically opened during a passive coolant containment system (PCCS) mode, during which mode a GDCS valve 144 is also opened allowing water from GDCS 120 to flow through a conduit 146 to replace coolant lost from vessel 106.

Figure 2:
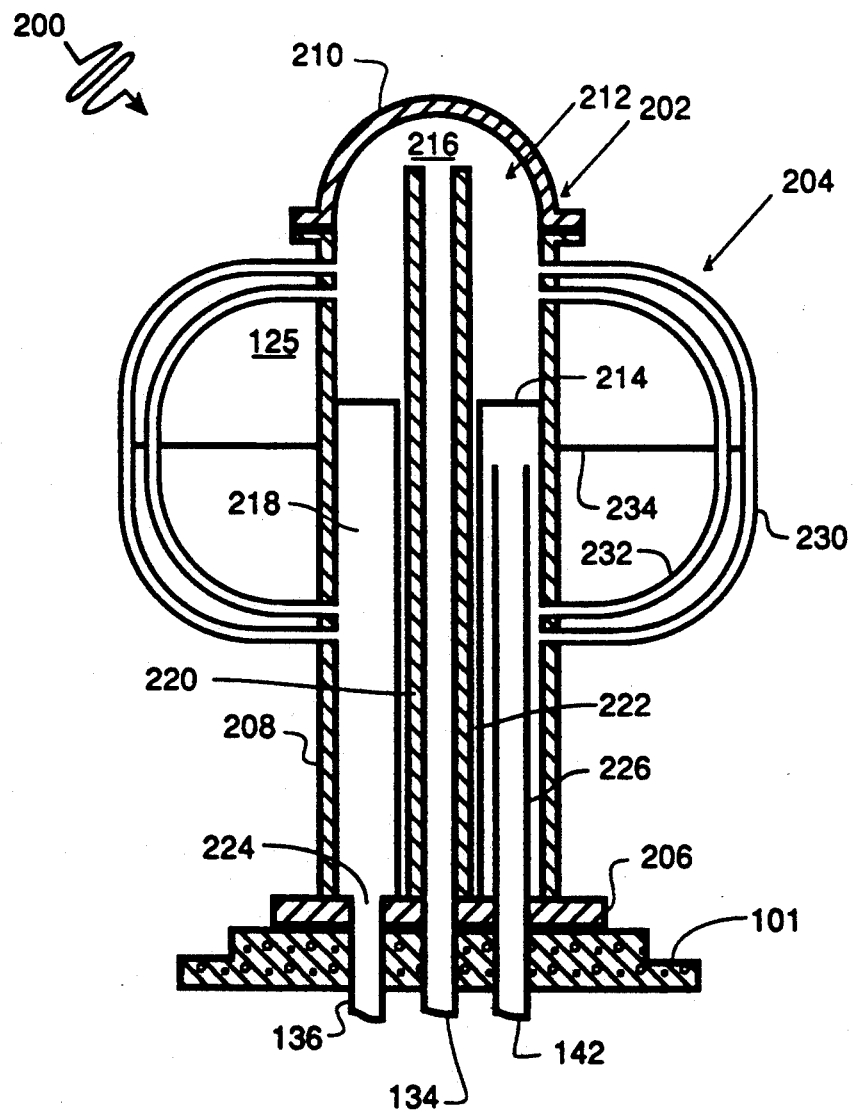
FIG. 2 is a schematic elevation view of an isolation condenser of the plant of FIG. 1.

Condenser 200 includes a chamber 202 and a annular manifold 204, as shown in FIG. 2. Chamber 202 comprises a diskshaped base 206, a vertically-extending cylindrical sidewall 208, and a semispherical cover 210. Chamber 202 isolates the enclosed condenser volume 212 from pool 125. An annular partition 214 divides condenser volume 212 into an upper distributor plenum 216 and an annular lower collector plenum 218.

Radially inward of collector plenum 218 is an inlet conduit 220, which serves as an extension of steam conduit 134. Inlet conduit 220 extends from the center of base 206 vertically well into distributor plenum 216. Inlet conduit 220 is a thick tube of stainless steel. The thickness helps insulate outgoing condensate in collector plenum 218 from heat of incoming steam rising through inlet conduit 220. Further insulation is provided by a vapor space 222 between partition 214 and inlet conduit 220. This vapor space 222 also allows differential thermal expansion of inlet conduit 220 and partition 214.

Collector plenum 218 is coupled through an aperture 224 in base 206 to conduit 136, which serves to drain condensate back to vessel 106. In addition, condenser 200 includes a vapor trap tube 226 which extends vertically more than half-way up collector plenum 218. Vapor trap tube 226 is coupled to conduit 142. When valve 140 is open, noncondensible gases accumulating in collector plenum 218 can escape into wet well 126 through conduit 142.

Manifold 204 comprises an outer array of 48 tubes 230 and an inner array of 48 tubes 232, for a total of 96 tubes. Each tube 230, 232 extends radially outward from distributor plenum 216 through sidewall 208 into pool 125, curves through pool 125, and extends radially inward through sidewall 208 to distributor plenum 218. Thus, manifold 204 provides the only fluid path within well 124 between distributor plenum 216 and collector plenum 218. Of course, there is another fluid path between plenums 216 and 218 through reactor vessel 106. A tube support 234 helps maintain the structural integrity of condenser 200.

During turbine isolation, steam from vessel 106 rises through conduit 136 and through inlet conduit 220, where it accumulates in distributor plenum 216. Steam accumulating in distributor plenum 216 is ushered out tubes 230 and 232, where it gives up thermal energy to pool 125 and at least partially condenses to water. The condensate flows into collector plenum 218, whence it can drain through base aperture 224 and conduit 136 back to reactor vessel 106. Vapor and noncondensible gases rise through liquid accumulated in distributor plenum 218. Most of the residual vapor condenses before leaving the liquid. Noncondensible gases of course do not liquefy and thus accumulate at the top of collector plenum 218. Under conditions producing sufficient noncondensible gas to interfere with the operation of condenser 200, valve 140 is opened to allow the noncondensible gases to escape into wet well 126.

A major advantage of condenser 200 is that there is only one boundary potentially subjected to severe pressure differentials, e.g., 1250 pounds per square inch. This boundary is constituted by sidewall 208 and cover 210. These components have cylindrical and spherical geometries that enclose maximum volume with for a given peripheral area, thus exhibiting favorable pressure bearing characteristics. In the conventional isolation condensers, two pressure bearing chambers are required, each having one or more flat surfaces exposed to the condenser pool. This less optimal geometry requires the additional thickness, reinforcement, and bulk. Of course, condenser 200 does provide separate distributor collector plenums 216 and 218. However, partition 214 which separates them can be relatively thin since the pressure differential across partition 214 is relatively small due to the fluid coupling through manifold 204. A flat geometry is provided by base 206, which is best suited for interfacing with conduits 134, 136, and 142. Since base 206 opposes concrete containment 101, it does not have to bear a pressure differential.

By way of comparison, a typical conventional condenser has two disk-shaped chambers with 7' diameters and wall thicknesses on the order of 3.75', although tubes extend to a diameter of 8'; the weight of such a condenser is about 43 tons. Similar capabilities can be provided in accordance with the present invention where sidewall 208 has a diameter of 3' and a thickness of 2.5". Cover 210 can be even thinner at 2.0". The gross weight of condenser 200 is about 13 tons, a reduction of about 70%. In order to provide thermal insulation, inlet conduit 220 can be about 2.0" thick. However, partition 214 can be relatively thin at about 0.375" thickness. Note that the relatively small and lightweight cover 210 provides relatively convenient access to the internals of condenser chamber 202.

Each tube 230, 232 is shown as being in a single radial plane so that it enters collector plenum 218 in the same circumferential coordinate as it exited distributor plenum 216. Alternatively, the tubes of the manifold can be coiled so that greater lengths can be achieved for a given manifold diameter. In addition, the lengths of tubes in inner and outer arrays can be equalized by assigning tighter pitches to the coils of inner array. Whether coiled or not, the tubes should return to the chamber at a level below the top of the exit for the noncondensible gases.

While the preferred condenser chamber geometry includes a disk-shaped base, a cylindrical sidewall, and a semispherical cover, other geometries are provided for. For example, the base can be semispherical so that the condenser chamber superficially resembles a reactor pressure vessel. With this capsule geometry, the condenser chamber can be spaced above the bottom of condenser well 124, the semispherical bottom being adapted for resisting potentially severe pressure differentials.

While cylindrical and spherical geometries are ideally suited for resisting pressure and isolating an enclosed volume from the condenser pool, other geometries are provided for. However, the condenser chamber should enclose a contiguous volume containing both the distributor plenum and the collector plenum. More specifically, the geometry of the chamber is such that every point on a line segment having as its endpoints points within said volume is in that volume. In other words, it is convex.

Furthermore, while the chamber geometry need not be spherical and cylindrical, it should be similar enough to those geometries to provide a substantial share of their advantages. The sidewall need not be as compact as a cylinder, which has a circular cross section, but it should be better than a box with a square cross section. In other words, the horizontal cross-sectional area of the sidewall should be greater than the square of one fourth of its perimeter. The cover should be dome-shaped, in other words, it should enclose a volume when mated with its reflection in a horizontal plane. Alternatively, every point on the cover surface, except at the flange, should have a center of curvature within the chamber volume. These and other modifications to and variations upon the described embodiments are provided for by the present invention, the scope of which is limited only by the following claims.

What is claimed is:

1. A reactor plant comprising:
a containment structure defining a wet well, a dry well, and a condenser well, said wet well being in fluid communication with said dry well, said dry well containing a noncondensible gas, said wet well and said condenser well containing condenser coolant during normal operation, said condenser well being vented to an external environment, said wet well and said dry well being in fluid isolation relative to said external environment;
a dual-phase reactor, said reactor having a reactor pressure vessel located within said dry well, said vessel containing a heat-transfer fluid during normal operation, said heat-transfer fluid including heat-transfer liquid and heat-transfer vapor, said vessel having a core for converting heat-transfer liquid to heat-transfer vapor, said reactor having a nominal liquid level;
a turbine;
turbine conduit means for conveying heat-transfer vapor to said turbine from said reactor;
a condenser disposed within said condenser well, said condenser having
a condenser chamber defining a contiguous condenser volume, said condenser chamber isolating said condenser volume from fluid exchange with said condenser coolant so that said condenser coolant is disposed outside said condenser chamber, said condenser chamber having a base, a vertically extending sidewall disposed on said base, said sidewall having an open top, a dome-shaped cover disposed on said sidewall to seal said top, a partition dividing said condenser volume into a distributor plenum and a collector plenum so that there is no fluid path entirely within said condenser chamber between said distributor plenum and said collector plenum, and a manifold including a plurality of tubes, each of said tubes extending from said distributor plenum, through said condenser coolant, and through said sidewall to said collector plenum;

pressure relief means for relieving excessive pressure within said reactor vessel by conveying heat-transfer fluid, primarily heat-transfer vapor, from said vessel to said collector plenum in the event of said excessive pressure, said pressure relief means being coupled to said reactor via a relief conduit mating with said reactor above said nominal liquid level and communicating with said distributor plenum through said base; and condensate return means for conveying heat-transfer liquid from said collector section to said reactor vessel through a condensate return conduit that mates with said reactor at a level below said nominal liquid level, said condensate return conduit communicating with said collector plenum through said base.

2. A reactor plant as recited in claim 1 further comprising a noncondensible gas conduit for transferring noncondensible gases from said collector plenum to said wet well, said noncondensible gas conduit extending through said base into said condenser volume to a level above a maximum level at which said tubes mate with said collector plenum.

3. A reactor plant as recited in claim 1 wherein the cross section of said sidewall has a perimeter and an area, said area being greater than the square of one-fourth of said perimeter.

* * * * *